SYSTEM FOR ELIMINATING PERIODIC NOISE IN AN INFINITESIMAL SIGNAL

Filed June 2, 1967 5 Sheets-Sheet 1

INVENTORS
MASHIO KODAMA
MASAHIRO HIROKAWA
TERUO YOKOKAWA
TAKAJI SUZUKI

BY Paul M. Craig, Jr.
ATTORNEY

INVENTORS
MASHIO KODAMA
MASAHIRO HIROKAWA
TERUO YOKOKAWA
TAKAJI SUZUKI

BY Paul M. Craig, Jr.
ATTORNEY

INVENTORS
MASHIO KODAMA
MASAHIRO HIROKAWA
TERUO YOKOKAWA
TAKAJI SUZUKI
BY Paul M. Craig, Jr.
ATTORNEY

INVENTORS
MASHIO KODAMA
MASAHIRO HIROKAWA
TERUO YOKOKAWA
TAKAJI SUZUKI

BY Paul M. Craig, Jr.
ATTORNEY

INVENTORS
MASHIO KODAMA
MASAHIRO HIROKAWA
TERUO YOKOKAWA
TAKAJI SUZUKI
BY Paul M. Craig, Jr.
ATTORNEY United States Patent Office 3,534,275
Patented Oct. 13, 1970

3,534,275

SYSTEM FOR ELIMINATING PERIODIC NOISE IN AN INFINITESIMAL SIGNAL

Mashio Kodama, Masahiro Hirokawa, and Teruo Yokokawa, Tokyo, and Takaji Suzuki, Kokubunji-shi, Japan, assignors to Hitachi, Ltd., Tokyo, Japan, a corporation of Japan Filed June 2, 1967, Ser. No. 643,132
Claims priority, application Japan, June 29, 1966, 41/41,818
Int. Cl. H03b *1/04*
U.S. Cl. 328—165 8 Claims

ABSTRACT OF THE DISCLOSURE

A system for eliminating periodic noise occurring at a particular frequency present in an infinitesimal signal existing in electronic circuitry such as that found in a bioelectricity measuring system for amplifying and recording the infinitesimal signal. The system includes a synchronous detector for detecting two separate phase components having individual amplitudes from the periodic noise at an arbitrary point in the electronic circuitry, and means for supplying to a point in the electronic circuitry a noise elimination signal having the same frequency as the periodic noise signal and having an amplitude and phase such that it will cancel out the periodic noise as a result of the synchronous detection.

This invention relates to systems for eliminating periodic noises encountered in handling an infinitesimal signal by electronic circuits, and more particularly to a novel system for eliminating a periodic noise from an infinitesimal signal to be handled by bioelectricity measuring devices such, for example, as electro-encephalographs and foetal electrocardiographs which are adapted to amplify and record an infinitesimal voltage. The term "periodic noise" is used herein to generally denote a noise at a specific frequency which comes from an external source of noise.

Bioelectricity measuring devices such as electroencephalographs and foetal electrocardiographs have heretofore been only satisfactorily operable in a shielded room, principally because that, without such a shielded room, noise at commercial frequencies is liable to appear and mix with a very small or infintesimal signal through the induction from lines of a domestic lighting power supply. An attempt has previously been made to solve the above problem by use of parallel filters of T-type connection, but the use of such filters has been proved unpractical in that the signal components at frequencies in the vicinity of the commercial frequency are also removed and thus a large degree of distortion takes place in the signal waveform.

It is therefore the primary object of the present invention to provide a system for effectively eliminating a periodic noise without the use of a shielded room.

Another object of the present invention is to provide a system for automatically eliminating a periodic noise having any amplitude and phase without using a shielded room for thereby giving a signal waveform which is free from any distortion.

The fundamental concept of the present invention resides in that, in an electronic circuit supplied with an input including a periodic noise therein, the amplitude of the periodic noise at an arbitrary point in the above electronic circuit is detected by means of synchronous detection by a signal at the same frequency as that of the noise, and a voltage having the same frequency as that of the periodic noise and having such an amplitude and phase as will cancel out the periodic noise appearing at the detected point is applied in response to the result of the above synchronous detection to the above detected point in the electronic circuit or to a point on the input side of the above detected point in the electronic circuit.

The structure and function of the present invention will become apparent from the following description with reference to the drawings.

Figure 1:
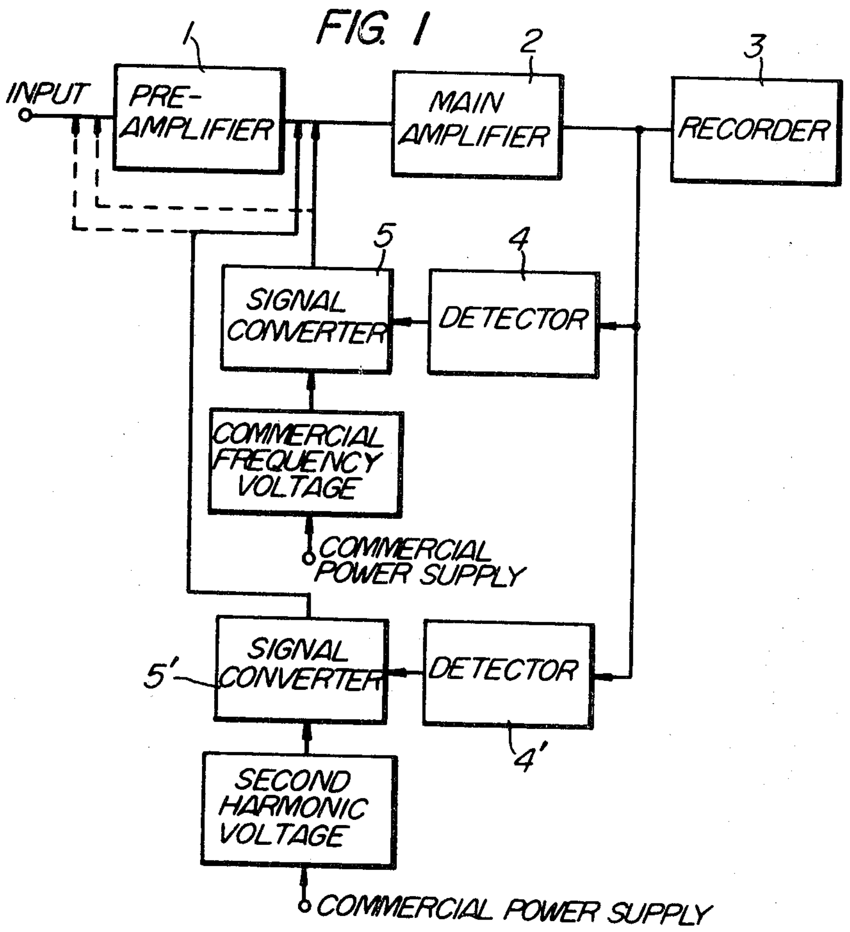
FIG. 1 is a block diagram illustrating the basic principle of the method according to the invention.

Referring to FIG. 1, the present invention will be described with regard to its application to a bioelectricity measuring device such as an electro-encephalograph. The bioelectricity measuring device embodying the method of the invention includes a pre-amplifier 1 and a main amplifier 2 for amplifying an infinitesimal signal at extremely low frequency derived from a living body and supplying the amplified signal to a recorder 3 for the recording of such signal. In accordance with the present invention, the output of the main amplifier 2 is fed into a detector 4 in which the amplitude of a noise at commercial frequency mixing in the output of the main amplifier 2 is detected through synchronous detection by a signal of the same frequency as the commercial frequency, and a signal converter 5 operative in response to the amplitude detection by the detector by the detector 4 applies to the input side of the main amplifier 2 or the preamplifier 1 a voltage which is at the commercial frequency and has such an amplitude and phase as will cancel out the noise existing in the input.

In case the noise voltage has a distorted waveform, noise eliminators including detectors and signal converters 4', 5' . . . for eliminating the second higher harmonic, third higher harmonic and other higher harmonics may be provided in addition to the noise eliminator for the commercial frequency noise component, which is the fundamental wave, for thereby eliminating all the frequency components of the noise.

There are a variety of practical means which may be preferably used for the practice of the present invention. Detection of the amplitude of a noise may be relatively simply attained by the use of a combination of a synchronous detector and a filter such, for example, as a C.R filter, and the use of the above combination is so effective that a noise at a specific frequency can be exclusively and almost entirely eliminated. Means for converting the detected quantity into a voltage at the commercial frequency or its higher harmonic may be any desired means known in the art and is in no way limited to special means. The noise detecting point may not necessarily be limited to the output side of the main amplifier 2, and the point of application of the noise cancelling voltage may not necessarily be limited to the input side of the main amplifier 2. For instance, the noise may be detected at the input side of the main amplifier 2 and the noise cancelling voltage may also be applied to the input side of the main amplifier 2, that is, the same side as that of the point of noise detection, or alternatively the noise cancelling voltage may be applied to the input side of the pre-amplifier 1 or the output side of the main amplifier 2.

Figure 2:
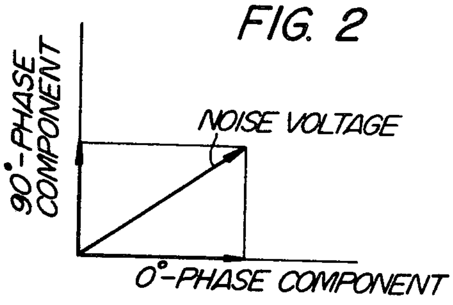
FIG. 2 is a vector analysis diagram of a noise voltage.

The phase of a noise voltage usually deviates from the phase of a power supply voltage, and varies from position to position of measurement. For a noise having such a variable and non-specific phase, the noise voltage or hum may, for example, be divided into two coordinate components which have a 0° phase and a 90° phase (but not limited to 90°) with respect to the phase of the reference voltage, that is, power supply voltage in a manner as shown in FIG. 2. The amplitude of each component may then be detected by the combination of a synchronous detector and a C.R filter to derive a DC voltage proportional to each amplitude. The signals obtained as a result of detection for the respective components may then be modulated by a 0°-phase and a 90°-phase voltage at the commercial frequency or its harmonics and the modulated outputs may then be combined together and subjected to wave shaping. Alternatively, the signals proportional to the amplitudes of the respective 0°-phase and 90°-phase components may be applied to exciting windings, disposed at right angles relative to each other, of a generator driven by a bipolar synchronous motor, and the resultant combined voltage derived from the rotor windings may be applied to the input side of the main amplifier 2 or pre-amplifier 1.

Figure 3:
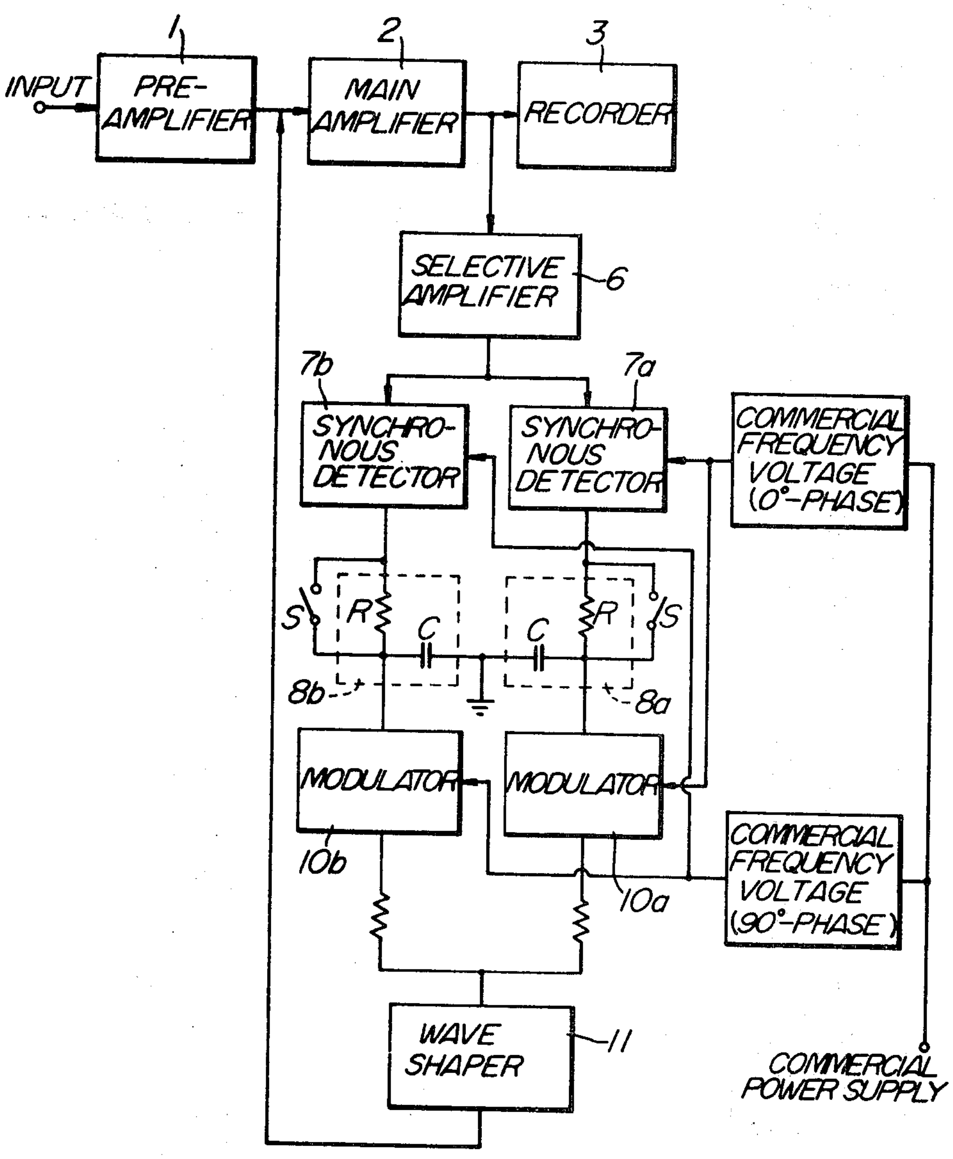
FIG. 3 is a block diagram showing an embodiment of the invention.

These practical means preferably used for the purpose will be described in detail with reference to the drawings. Referring to FIG. 3, a selective amplifier 6 is operative to selectively amplify a noise at the commercial frequency mixing in the output of the main amplifier 2. The selective amplifier 6 is so designed as to solely amplify the commercial frequency and those frequency components in the vicinity of the commercial frequency, and is operative to amplify an infinitesimal noise voltage to thereby facilitate the detection thereof and to prevent synchronous detectors 7*a* and 7*b* in the succeeding stage from being saturated with a signal such as a brain wave which is the primary object of measurement.

The synchronous detectors 7*a* and 7*b* are provided to deal with the 0°-phase voltage and 90°-phase voltage, respectively, and are followed by respective C.R filters 8*a* and 8*b*. These two sets of synchronous detectors and C.R filters divide the noise voltage at the commercial frequency into two components, of which one is in phase and the other in 90° out of phase with respect to the reference phase of the power supply voltage for thereby detecting the amplitudes of the respective components.

Figure 4:
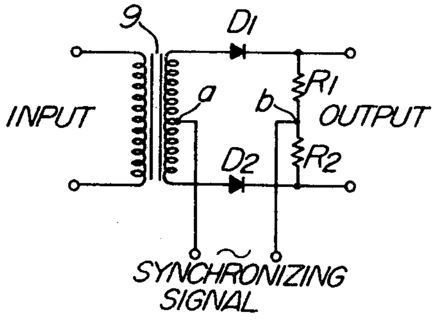
FIG. 4 is an explanatory circuit diagram of a synchronous detector employed in the circuit of FIG. 3.

Referring to FIG. 4, the structure and function of the synchronous detector will be described. The synchronous detector includes therein an input transformer 9 whose primary side is connected to the input, and two diodes $D_1$ and $D_2$ connected in a circuit on the secondary side of the input transformer 9. When a synchronizing signal at the commercial frequency is applied across an intermediate point *a* of the secondary side of the input transformer 9 and an intermediate point *b* between series resistors $R_1$ and $R_2$, the diodes $D_1$ and $D_2$ are both driven to their on state in response to the arrival of such a half wave of the synchronizing signal with which the point *a* becomes positive relative to the point *b*, and an output signal appears across output terminals, while the diodes $D_1$ and $D_2$ are both driven to their cutoff state in response to arrival of the opposite half wave of the synchronizing signal and no output signal appears across the output terminals.

Figure 5:
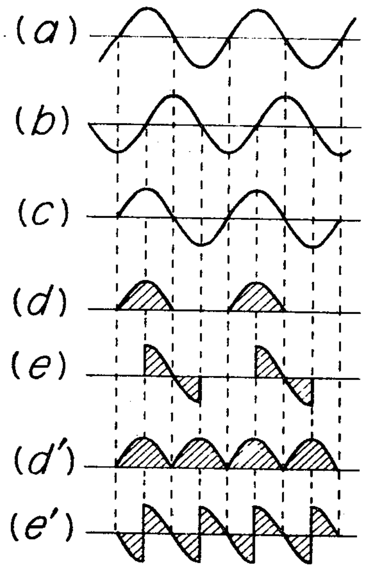
FIG. 5 is a graphic illustration of voltage waveforms at various points in the synchronous detector of FIG. 4.

Accordingly, a 0°-phase synchronizing signal at the commercial frequency which has a waveform as shown in FIG. 5*a* may be supplied from a commercial power supply to the synchronous detector 7*a*, while a 90°-phase synchronizing signal at the commercial frequency which has a waveform as shown in FIG. 5*b* may be supplied from the commercial power supply to the synchronous detector 7*b*. With such an ararngement, when the phase of the input voltage is in register with the 0° phase of the power supply voltage as shown is FIG. 5*c*, a DC output as shown in FIG. 5*d* appears across the output terminals of the synchronous detector 7*a*, while a zero DC output appears across the output terminals of the synchronous detector 7*b* since the output has the symmetrical positive and negative signs as shown in FIG. 5*e*. The above relation, however, is reversed when the phase of the input voltage is 90° out of phase with respect to the phase as shown in FIG. 5*c*. It will thus be understood that, when the frequency $f$ of the input voltage completely coincides with the frequency $fs$ of the synchronizing signal, the synchronous detectors 7*a* and 7*b* deliver respective DC voltages which are proportional to the 0°-phase component and the 90°-phase component of the input voltage. On the other hand, when the frequency $f$ of the input voltage differs from the frequency $fs$ of the synchronizing signal, the synchronous detectors 7*a* and 7*b* deliver voltages at the frequency of $(fs-f)$.

Therefore, a C.R filter or a C.L. filter may be provided on the output side of each synchronous detector and may be designed to have a sufficiently large time constant $\tau=C\cdot R$ so that all the AC outputs can be rendered zero, and that input component which is in perfect synchronism with the synchronizing signal can be solely smoothed out to be derived as a DC voltage. By the above treatment, the noise voltage which is in synchronism with the power supply voltage can be solely and exclusively extracted from the main amplifier output, and the noise voltage can thus be detected as the independent signals separated into the 0°-phase component and the 90°-phase component and having the respective amplitudes.

Figure 6:
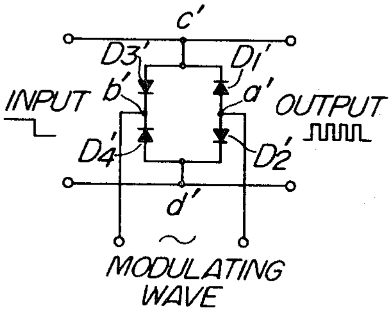
FIG. 6 is an explanatory circuit diagram of a chopper type modulator employed in the circuit of FIG. 3.

Both of these signals are then fed into chopper type modulators 10*a* and 10*b* wherein these signals are modulated by the 0°-phase and 90°-phase voltages at the commercial frequency supplied from the commercial power supply. As one form of such chopper type modulator, a diode chopper is illustrated in FIG. 6, and includes therein a bridge circuit composed of four diodes $D_1'$ to $D_4'$. When the voltage at the commercial frequency is applied across points *a'* and *b'* of the bridge circuit, the diodes $D_1'$ to $D_4'$ are driven to their on state in response to appearance of such a half wave with which the point *a'* is rendered positive relative to the point *b'*, and two points *c'* and *d'* in the bridge circuit are thereby apparently short-circuited. On the other hand, the diodes $D_1'$ to $D_4'$ are driven to their cutoff state in response to the appearance of the opposite half wave, and the two points *c'* and *d'* in the bridge circuit are thereby open-circuited, with the result that the DC input is modulated by the commercial frequency to appear as an output voltage across the output terminals of the chopper.

The outputs of the modulators 10*a* and 10*b* are combined together and the combined output is shaped to a waveform substantially analogous to a sine wave in a wave shaper 11. The output of the wave shaper 11 is a commercial frequency voltage which is perfectly in phase with the pure noise voltage in the main amplifier output and has an amplitude proportional to the magnitude of the noise. This output of the wave shaper 11 is applied as a negative feedback voltage to the input side of the main amplifier 2 for thereby cancelling out the noise.

Suppose now that $e_i$ is a noise input voltage calculated from the output, $e_o$ is a noise output voltage, $A_P$ is the amplification factor of the pre-amplifier, $A_D$ is the amplification factor of the main amplifier, and $A_F$ is the amplification factor of the noise cancelling circuit according to the method of the present invention. Then $e_o$ is given by $$e_o=e_iA_PA_D\frac{1}{1+A_F\cdot A_D}$$

On the other hand, a noise output voltage $e_o'$ which is delivered in the absence of the noise cancelling circuit according to the method of the present invention is given by $$e_o'=e_iA_PA_D$$

Therefore, the noise reduction rate $e_o/e_o'$ derivable by the method of the present invention is given by $$e_o/e_o'=\frac{1}{1+A_F\cdot A_D}$$

and thus it will be seen that the greater portion of the noise can be successfully eliminated.

Figure 7:
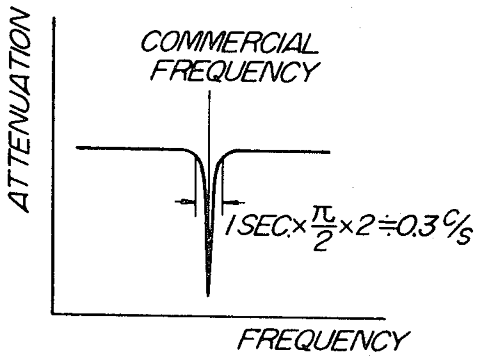
FIG. 7 is a graphic illustration of the frequency characteristic of the circuit of FIG. 3.

According to the method of the present invention, the noise can be more effectively eliminated with an increase in the time constant CR. However, a time constant which is too large will result in such an insufficient operation of the circuit that the circuit can only poorly follow up a change in the amplitude of the noise when such change is due to a change in the measuring conditions or the like. In view of the above, it is preferable in practical applications that $$\frac{CR}{1/2A_F\cdot A_D}$$

is set at a value which is in the order of 1 second. With the above value of $$\frac{CR}{1/2A_F\cdot A_D}$$

the circuit shown in FIG. 3 will have an apparent frequency characteristic as shown in FIG. 7, from which it will be known that an output portion lying within a range of +0.15 c.p.s. about the commercial frequency solely disappears and distortion in the signal waveform hardly takes place.

In a device such as an electrocardiograph in which measurement is taken by successively switching over a plurality of measuring electrodes by means of a lead selector, the noise has in many cases different amplitudes for individual measuring electrodes and the speed with which the device can follow up the amplitude change during the switch-over from electrode to electrode is generally a problem. In order to deal with such a situation, a switch S may be provided in parallel with the resistor R in each filter and may be interlocked with the lead selector for interengaged operation therewith. By closing the switches S for a short time immediately after the switch-over from one measuring electrode to another for thereby shortening the time constant, the noise cancelling circuit has an increased capability of follow-up, and a period until the noise cancelling effect appears after the switch-over can be shortened to provide ease of measurement. It will further be understood that the above arrangement is also an effective means for causing the noise cancelling circuit to quickly follow up an abrupt change in the noise amplitude which is frequently encountered in a device such as an electro-encephalograph.

Figure 8:
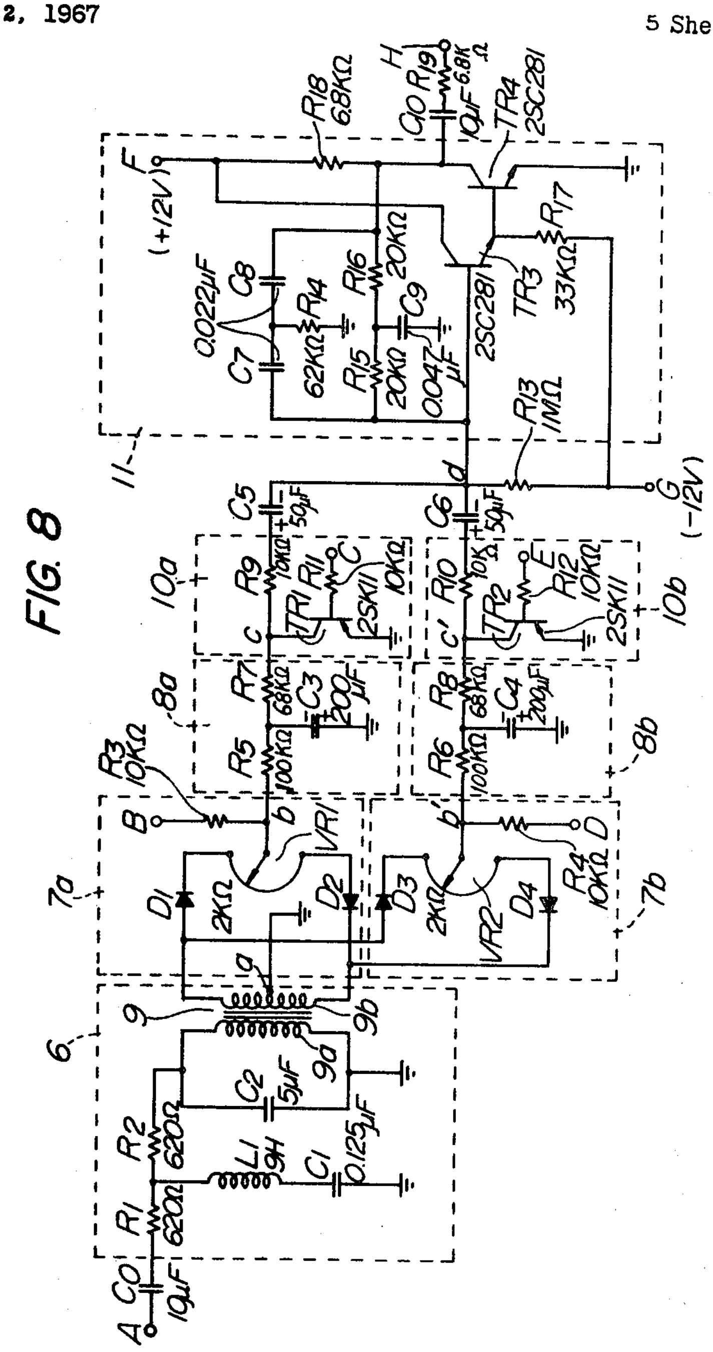
FIG. 8 is a detailed connection diagram representing a practical form of the noise eliminating circuit shown in FIG. 3.

A more practical form of the noise cancelling circuit schematically illustrated in FIG. 3 will be described with reference to FIG. 8. In FIG. 8, the main amplifier output including the noise at the commercial frequency is admitted through a terminal A and through a coupling capacitor $C_o$ into a selective amplifier 6. The selective amplifier 6 is provided with a parallel resonance circuit consisting of a primary winding 9*a* of a transformer 9 and a capacitor $C_2$, and a series resonance circuit connected in parallel with the above parallel resonance circuit and consisting of a reactor $L_1$ and a capacitor $C_1$. The parallel resonance circuit consisting of the transformer primary winding 9*a* and the capacitor $C_2$ is tuned with the commercial frequency (for example, 50 c.p.s.), while the series resonance circuit consisting of the reactor $L_1$ and the capacitor $C_1$ is tuned with the third harmonic of the commercial frequency to cause bypass of the same. Therefore, the noise output from the main amplifier excluding the third harmonic, that is, the commercial frequency and frequency components in the vicinity of the commercial frequency are solely subject to selective amplification by the selective amplifier 6 and the amplified output thereof is sent to the next stage through the transformer 9. The transformer 9 has an output or secondary winding 9*b* connected to a synchronous detector 7*a* for the 0°-phase component and a synchronous detector 7*b* for the 90°-phase component. The synchronous detector 7*a* is so constructed that a synchronizing signal applied across an intermediate or neutral point *a* of the secondary winding 9*b* of the transformer 9 and a point *b* on the slider of a variable resistor $VR_1$ can control the conducting state of diodes $D_1$ and $D_2$ connected between both ends of the transformetr secondary winding 9*b* and the variable resistor $VR_1$ for thereby deriving an output across the points *a* and *b*, while the synchronous detector 7*b* is so constructed that a synchronizing signal applied across the intermediate or neutral point *a* of the secondary winding 9*b* of the transformer 9 and a point *b'* on the slider of a variable resistor $VR_2$ can control the conducting state of diodes $D_3$ and $D_4$ connected between both ends of the transformer secondary winding 9*b* and the variable resistor $VR_2$ for thereby deriving an output across the points *a* and *b'*.

The 0°-phase synchronizing signal at the commercial frequency having a waveform as shown in FIG. 5*a* is applied to a signal receiving terminal B of the synchronous detector 7*a* for the 0°-phase component, while the 90°-phase synchronizing signal at the commercial frequency having a waveform as shown in FIG 5*b* is applied to a signal receiving terminal D of the synchronous detector 7*b* for the 90°-phase component. In the synchronous detector 7*a*, the diodes $D_1$ and $D_2$ are biased by the synchronizing signal in such directions that the diode $D_2$ is driven to its conducting state and the diode $D_1$ is driven to its non-conducting state by the arrival of such a half wave of the synchronizing signal with which the terminal B becomes positive with respect to the point *a*, and the diode $D_1$ is driven to its conducting state and the diode $D_2$ is driven to its non-conducing state by the arrival of the opposite half wave of the synchronizing signal with which the terminal B becomes negative with respect to the point *a*. On the other hand, in the synchronous detector 7*b*, the diodes $D_3$ and $D_4$ are biased by the synchronizing signal in such directions that the diode $D_4$ is driven to its conducting state and the diode, $D_3$ is driven to its non-conducting state by the arrival of such a half wave of the synchronizing signal with which the terminal D becomes positive with respect to the point *a*, and the diode $D_3$ is driven to its conducting state and the diode $D_4$ is driven to its non-conducting state by the arrival of the opposite half wave of the synchronizing signal with which the terminal D becomes negative with respect to the point *a*. Suppose now that the direction in which the current flows from the point *b* or *b'* to the point *a* is positive. Then, when the input voltage arriving through the transformer 9 has a waveform as shown in FIG. 5*c*, the synchronous detector 7*a* delivers an output of a waveform as shown in FIG. 5*d'*, while the synchronous detector 7*b* delivers an output of a waveform as shown in FIG. 5*e'*. In other words, the synchronous detectors shown in FIG. 8 are of the full-wave rectifying type, whereas that shown in FIG. 4 is of the half-wave rectifying type. The output of the synchronous detector 7*a* is applied to a filter 8*a* consisting of a capacitor $C_3$ and resistors $R_5$ and $R_7$, while the output of the synchronous detector 7*b* is applied to a filter 8*b* consisting of a capacitor $C_4$ and resistors $R_6$ and $R_8$, so that the respective DC components of the outputs charge the capacitors $C_3$ and $C_4$ to a polarity as shown. As described previously with reference to FIG. 3, the DC voltages appearing across the capacitors $C_3$ and $C_4$ have magnitudes which are proportional to the repective amplitudes of the 0°-phase component and the 90°-phase component of the noise voltage at the commercial frequency.

Modulators 10*a* and 10*b* connected in the succeeding stage of the respective filters 8*a* and 8*b* are shown herein as transistor choppers instead of the diode chopper as shown in FIG. 6. A PNP transistor $TR_1$ forming the modulator 10*a* is so arranged that a negative signal voltage obtained by half-wave rectification of the 0°-phase synchronizing signal of the waveform shown in FIG. 5*a* is applied to its base terminal C and the voltage appearing across the capacitor $C_3$ is applied across its emitter emitter and collector through the resistor $R_8$. Therefore, transistor $TR_1$ conducts solely for a limited period in which its base potential becomes negative, and its collector potential is thereby increased. As a result, a voltage obtained by modulating the DC input from the filter 8*a* by the 0°-phase voltage at the commercial frequency appears at the junction point *c* of the transistor $TR_1$ and the resistor $R_7$. On the other hand, a PNP transistor $TR_2$ forming the modulator 10*b* is so arranged that a negative signal voltage obtained by half-wave rectification of the 90°-phase synchronizing signal of the waveform shown in FIG. 5*b* is applied to its base terminal E and the voltage appearing across the capacitor $C_4$ is applied across its emitter and collector through the resistor $R_8$. Therefore, the transistor $TR_2$ conducts solely for a limited period in which its base potential becomes negative, and its collector potential is thereby increased. As a result, a voltage obtained by modulating the DC input from the filter 8*b* by the 90°-phase voltage at the commerical frequency appears at the junction point *c'* of the transistor $TR_2$ and the resistor $R_8$. The outputs of these modulators 10*a* and 10*b* are led through respective resistors $R_9$, $R_{10}$ and capacitors $C_5$, $C_6$ to be combined together at a point *d*, and the resultant combined voltage appears across a resistor $R_{13}$ connected between the point *d* and a negative power supply terminal G.

A wave shaper 11 disposed in the next stage is provided with two transistors $TR_3$ and $TR_4$ connected in the form of the Darlington connection, and a feedback circuit consisting of parallel T connections of capacitors $C_7$, $C_8$ and $C_9$ and resistors $R_{14}$, $R_{15}$ and $R_{16}$ connected between the collector of the succeeding transistor $TR_4$ and the base of the preceding transistor $TR_3$. The wave shaper 11 is thus constructed to operate as a narrow-band amplifier which selectively amplifies solely the commerical frequency component in the input signal. The composite output obtained by combining the outputs of the modulators 10*a* and 10*b* at the point *d* is subjected to selective amplification by the wave shaper 11, and a voltage at the commercial frequency appears at an output terminal H, which voltage has the same phase as that of the pure noise voltage in the main amplifier output and has an amplitude proportional to the magnitude of the noise. As described previously with reference to FIG. 3, the output derived from the output terminal H is diverted for negative feedback to the input side of the main amplifier and is used to cancel out the noise in the input.

The synchronous detectors employed in the circuit of FIG. 8 have such an inherent character that they do not deliver a DC output for the even harmonics of the fundamental wave but deliver an output of asymmetrical positive and negative signs including a DC component therein for the odd harmonics of the fundamental wave. Therefore, when the odd harmonics, especially, the third harmonic of the commercial frequency are contained in the input to the synchronous detectors, these harmonic components are converted into an output at the commercial frequency, and this output is negatively fed back to the input side of the main amplifier to appear as a periodic noise at the commercial frequency. The series resonance circuit of the reactor $L_1$ and the capacitor $C_1$ shown in FIG. 8 is provided to obviate such a detrimental effect of the odd harmonic or the third higher harmonic. If desired, similar means may be additionally provided to eliminate the fifth, seventh and other odd harmonics. In an actual example employing the circuitry of FIG. 8 and employing a main amplifier having an amplification factor of $A_D=150$, it was possible to reduce the periodic noise appearing at the output side of the main amplifier to less than 1/10 of the noise observed with a device without any provision of such circuit. The frequency band that can be cancelled out in this case is 50±0.2 c.p.s.

Figure 9:
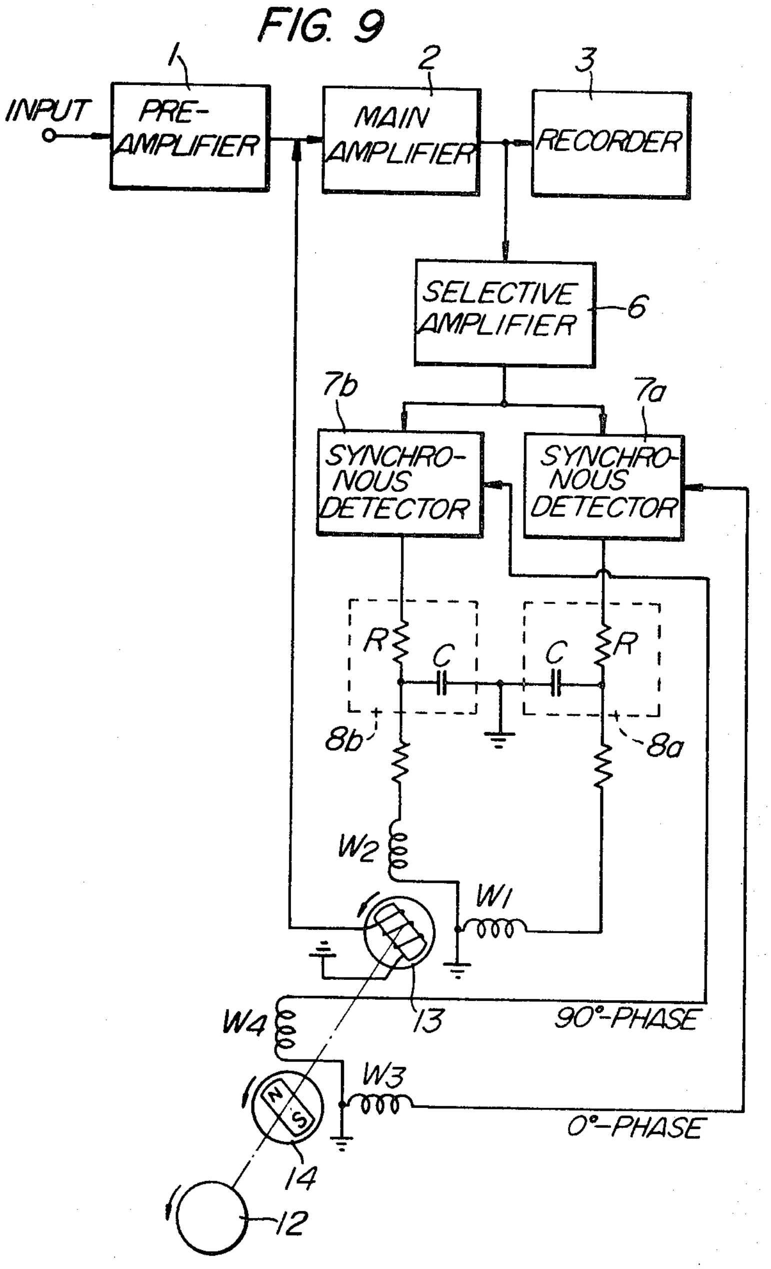
FIG. 9 is a block diagram showing another embodiment according to the invention.

A second embodiment of the present invention is schematically illustrated in FIG. 9. The second embodiment differs from the first embodiment shown in FIG. 3 in that a generator 13 driven by a bipolar synchronous motor 12 is provided in the former in lieu of the chopper type modulators provided in the latter. The generator 13 has two exciting windings $W_1$ and $W_2$ which are arranged at right angles with each other so as to be applied by respective DC voltages corresponding to the 0°-phase component and the 90°-phase component of the noise voltage. In FIG. 9, a composite magnetic field established by these exciting windings $W_1$ and $W_2$ is utilized to derive from the rotor winding a voltage at the commercial frequency which is in phase with the noise voltage and which has an amplitude proportional to the magnitude of the noise.

Another generator 14, which is arranged to be driven in simultaneous relation with the generator 13, has two windings $W_3$ and $W_4$ and serves as a source of commercial frequency power supply for supplying synchronizing signals of the 0° phase and 90° phase to respective synchronous detectors 7*a* and 7*b*.

The two embodiments are both based on the same principle in that a noise is divided into two coordinate components for the sake of detection of the amplitudes of the respective components, and the amplitude and phase of a feedback voltage are controlled on the basis of the result of amplitude detection on the respective components. These methods are also applicable to the elimination of noises at the second, third and other higher harmonic frequencies of the commercial frequency.

From the foregoing description, it will be appreciated that the present invention can effectively eliminate even a noise component of opposite phase which can not be eliminated with a differential amplifier. Also, according to the present invention, even when the amplitude and/or the phase of periodic noise are variable depending on the point where the measurement is to be carried out, such periodic noise can be automatically eliminated without any additional manual adjustment. In addition, the present invention, when applied to electro-encephalographs, foetal electrocardiographs and the like, eliminates the necessity for the provision of a special shielded room and permits free measurement in an ordinary ward. Further, when applied to electrocardiographs, the present invention eliminates the necessity for the provision of a grounded electrode on the right leg of a human body and permits measurement without any use of ground connection, thus ensuring the desired safety required for the measurement of this kind.

It will be appreciated that the method of the present invention is featured by the fact that the noise alone can be almost exclusively cancelled out and the signal waveform is substantially free from any distortion unlike the signal waveform obtained with a conventional noise eliminating filter. Further, according to the invention, the noise eliminating effect is in no way adversely affected by a deviation of the power supply frequency from its nominal value.

What is claimed is:

1. A system for eliminating periodic noise contained in an infinitesimal signal, comprising:
   a pair of synchronous detector means for deriving from an arbitrary point in the system DC signals having magnitudes corresponding to respective amplitudes of different phase components of the periodic signal at said arbitrary point, said phase components being in synchronism with AC synchronizing signals having the same frequency as said periodic noise and phases different from each other;

means for converting the DC signals derived by said synchronous detector means into AC signals having the same frequency as said periodic signal and amplitudes corresponding to the magnitude of said DC signals; and means for summing said converted AC signals to produce a noise elimination signal having the same frequency as said periodic signal and having such an amplitude and phase that will cancel out the periodic noise at a point in said system to which said noise elimination signal is to be applied.

2. A system according to claim 1, wherein each of said pair of synchronous detector means includes a synchronous detector adapted to receive an AC signal at the same frequency as that of the periodic noise to be eliminated, an RC filter connected to the output of said detector to remove the AC component from the output signal of the detector and a switching means for adjusting the time constant of said filter, the phases of said AC signals to be received by said synchronous detectors being different from each other.

3. A system according to claim 1, wherein means is provided at a stage next proceeding said synchronous detector means for selectively amplifying signals having substantially the fundamental frequency of said periodic noise to be eliminated and for removing the odd higher harmonic components of the periodic noise.

4. A system as defined in claim 3, wherein each of said pair of synchronous detector means includes a synchronous detector adapted to receive an AC signal at the same frequency as that of the periodic noise to be eliminated, an RC filter connected to the output of said detector to remove the AC component from the output signal of said detector and a switching means for adjusting the time constant of said filter, the phases of said AC signals to be received by said synchronous detectors being different from each other.

5. A system according to claim 2, wherein said synchronous detector is a full-wave rectifying type.

6. A system according to claim 1, wherein the means for converting the DC signals into AC signals includes a pair of modulators.

7. A system according to claim 6, wherein each of said pair of modulators comprises a chopper type modulator.

8. A system according to claim 6, wherein said modulator comprises a generator driven by a bi-polar synchronous motor.

References Cited

UNITED STATES PATENTS

| | | | |
|---|---|---|---|
| 1,687,295 | 10/1928 | Hubner | 325—475 |
| 3,084,329 | 4/1963 | Clay | 325—476 XR |
| 3,177,489 | 4/1965 | Saltzberg | 325—476 XR |
| 3,204,047 | 8/1965 | Trost et al. | 328—165 XR |

STANLEY T. KRAWCZEWICZ, Primary Examiner

U.S. Cl. X.R.

325—476